Aug. 27, 1935. C. L. THORNE ET AL 2,012,523
APPARATUS FOR DISSEMINATING INSECT EXTERMINATING MATERIALS AND THE LIKE
Filed March 2, 1933 4 Sheets-Sheet 2
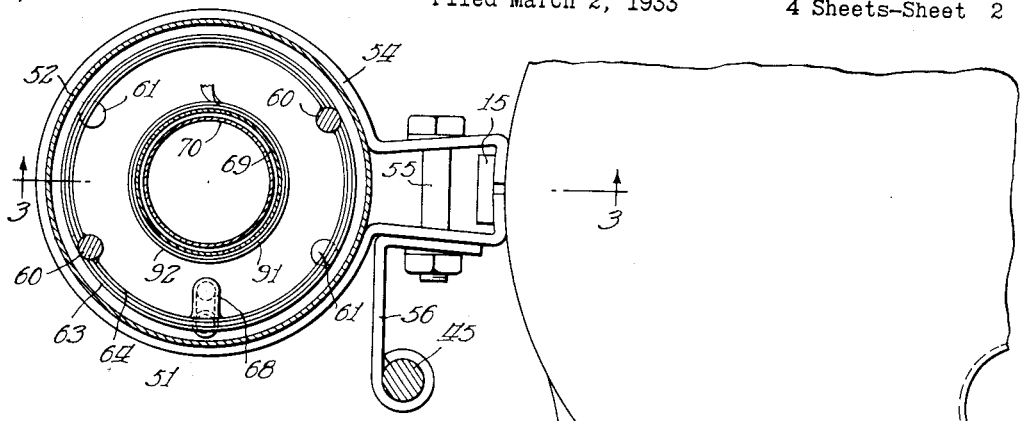
Fig. 2
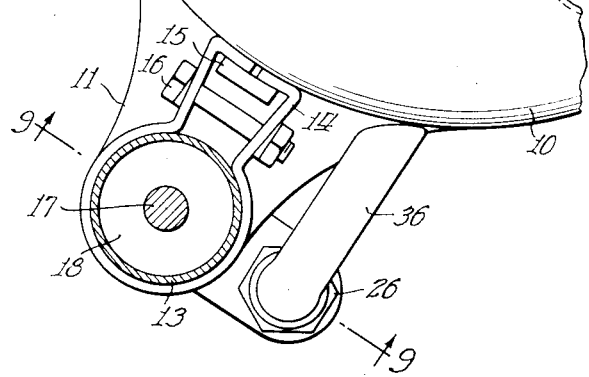
Fig. 3
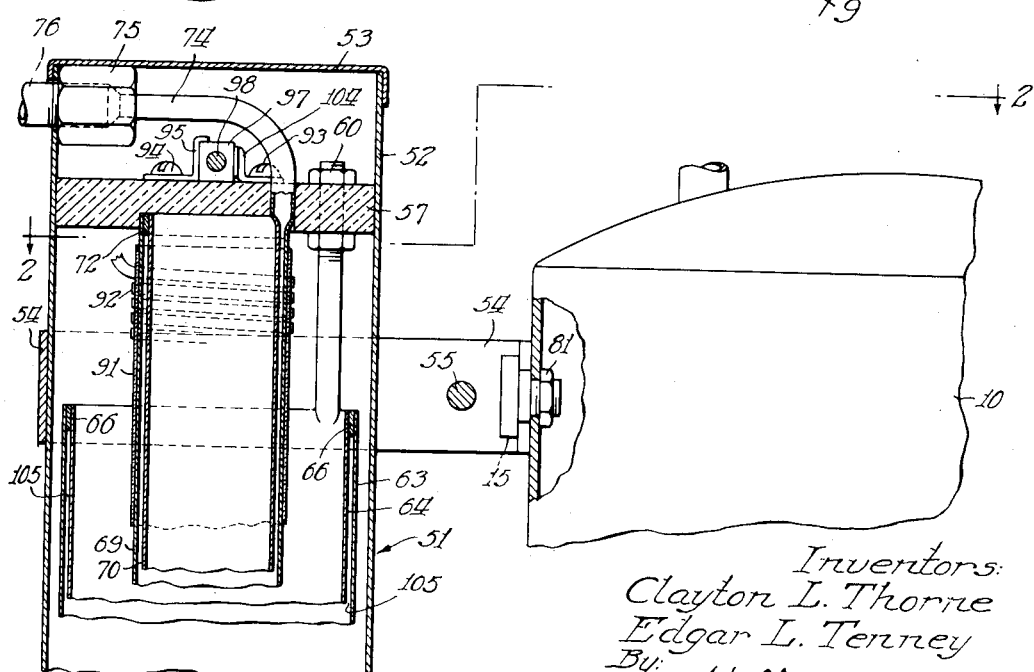
Inventors:
Clayton L. Thorne
Edgar L. Tenney
By: Hill and Hill
Attys Aug. 27, 1935. C. L. THORNE ET AL 2,012,523
APPARATUS FOR DISSEMINATING INSECT EXTERMINATING MATERIALS AND THE LIKE
Filed March 2, 1933 4 Sheets-Sheet 3

Inventors:
Clayton L. Thorne
Edgar L. Tenney
By Hill and Hill Attys.

Aug. 27, 1935.  C. L. THORNE ET AL  2,012,523
APPARATUS FOR DISSEMINATING INSECT EXTERMINATING MATERIALS AND THE LIKE
Filed March 2, 1933  4 Sheets-Sheet 4
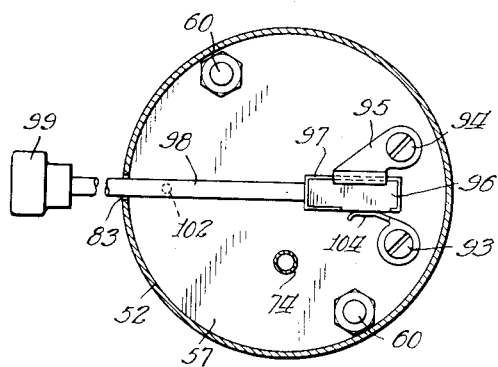
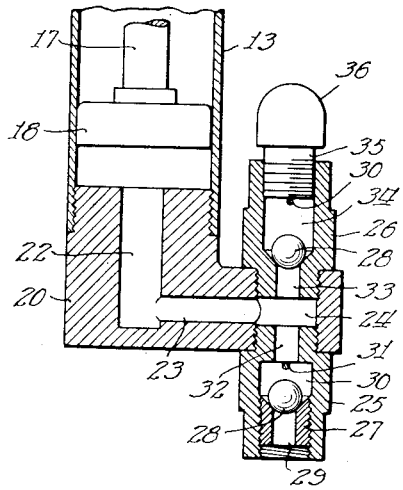
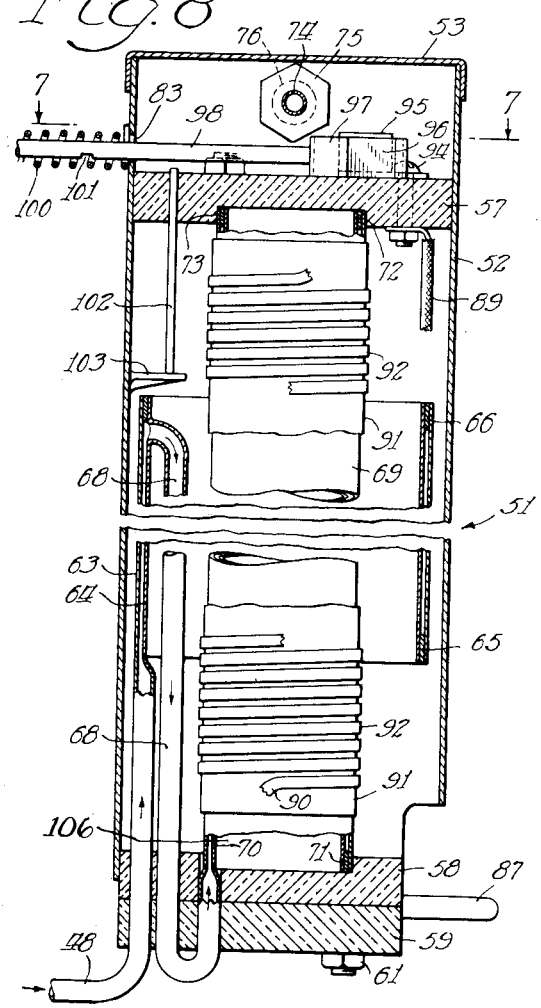
Inventors:
Clayton L. Thorne
Edgar L. Tenney
By Hill and Hill
Attys Patented Aug. 27, 1935

2,012,523

UNITED STATES PATENT OFFICE 2,012,523

APPARATUS FOR DISSEMINATING INSECT EXTERMINATING MATERIALS AND THE LIKE

Clayton L. Thorne and Edgar L. Tenney, Chicago, Ill., assignors to International Exterminator Company, Incorporated, Chicago, Ill., a corporation of Illinois Application March 2, 1933, Serial No. 659,312

5 Claims. (Cl. 219—38)

The invention relates to devices for generating and thoroughly disseminating vapors throughout a room and remote crevices. More particularly the invention relates to a device for practicing the method described in the copending application of Homer C. McDaniel, Serial Number 659,313, filed March 2, 1933. The device provides means for generating and superheating steam and mixing same with a liquid insecticide, germicide, fumigant, deodorant, or the like in a manner that the mixture is discharged from the device in the form of a dry vapor which disseminates itself through a room and enters into remote crevices and corners where insects or vermin are prone to congregate.

The invention has as one of its objects the provision of an improved portable apparatus adapted for generating superheated steam in combination with means for mixing the steam with liquid in a manner that the mixture takes the form of a dry vapor tending to disseminate itself throughout a room.

Another object of the invention is the provision of an improved generator and vapor dispenser of the kind described which is compact, durable and satisfactory for its intended purpose.

Many other objects and advantages of the construction herein shown and described will be obvious to those skilled in the art from the disclosure herein given.

To this end, our invention consists in the novel construction, arrangement and combination of parts herein shown and described.

In the drawings, wherein like reference characters indicate like or corresponding parts:

Fig. 2 is a sectional view of a steam generator and pump barrel and a plan view of a fragmentary portion of a container shown in elevation in Fig. 1.

Fig. 3 is a view along the line 3—3 of Fig. 2;

Fig. 7 is a view along the line 7—7 of Fig. 8;

Fig. 8 is a vertical sectional view through the steam generator;

Fig. 9 is a view along the line 9—9 of Fig. 2; and

Fig. 10 is a detail section of a nozzle forming a portion of the device.

Figure 1:
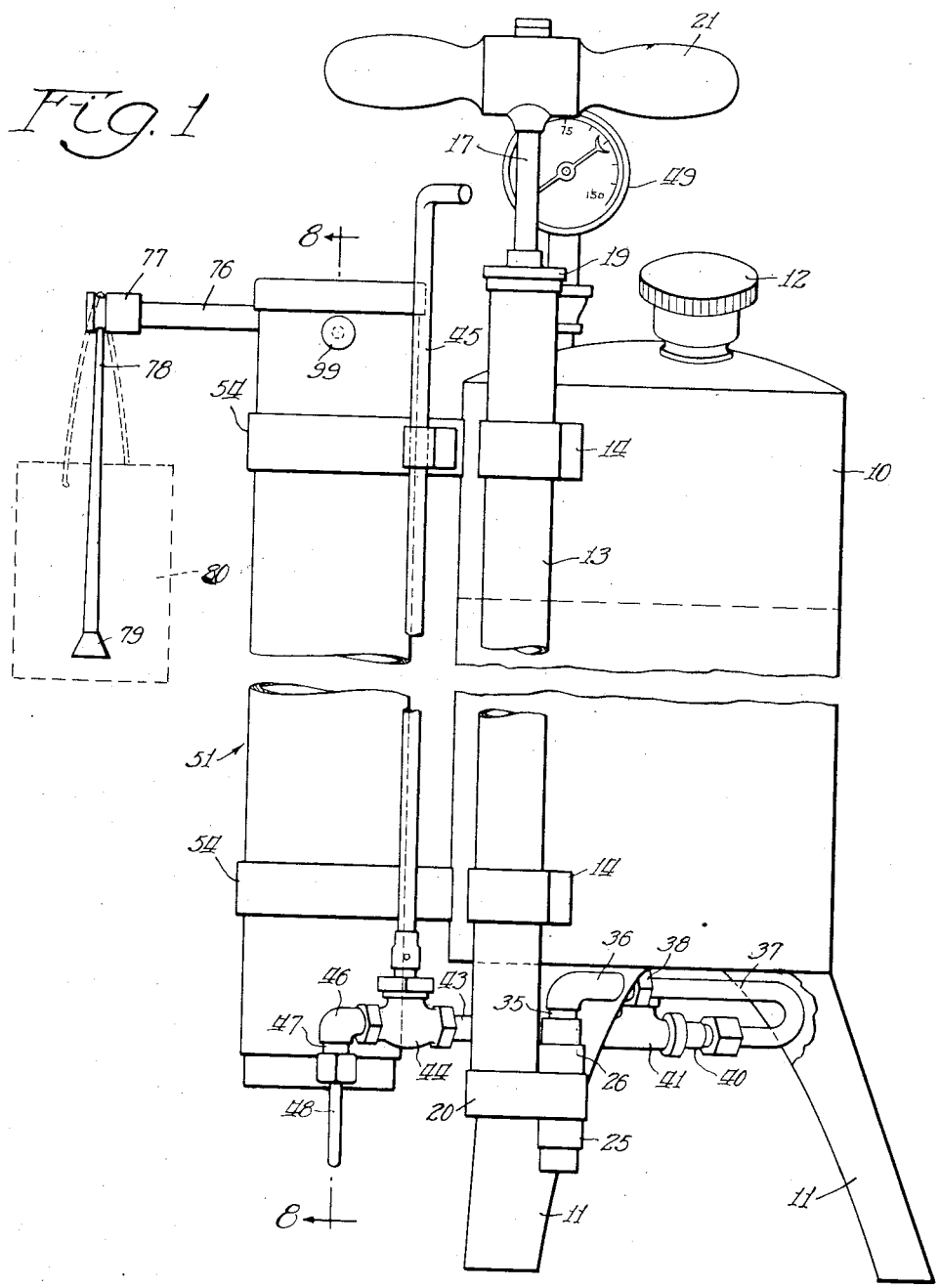
Fig. 1 is an elevational view of a device illustrating one embodiment of the invention.
Figure 4:
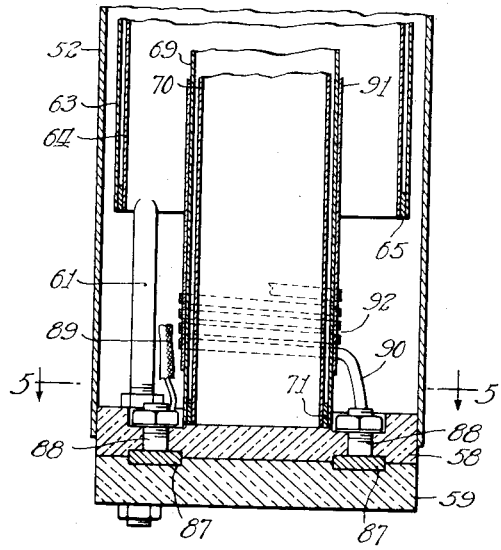
Fig. 4 is a longitudinal sectional view through the lower end of the steam generator forming a portion of the device.
Figure 5:
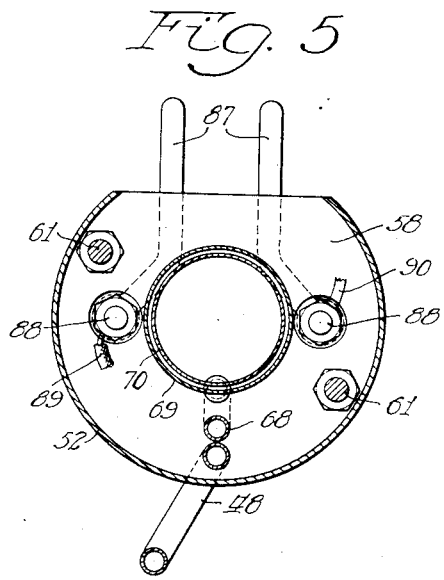
Fig. 5 is a section along the line 5—5 of Fig. 4.

Referring more particularly to the drawings, the numeral 10 generally designates a water container resting upon legs 11 and provided at the top with a filler cap 12. The water is maintained under pressure in the container 10 by means of an air pump, the pressure being indicated by a gauge 49. The air pump includes a barrel 13, fastened to the container 10 by a plurality of clamps 14. The free ends of the clamps 14 each engage the head of a clamp stud 15 threaded through the side wall of the container 10 and held in position by a nut 31. The ends of the clamps 14 are held in operative relation to the studs 15 by means of bolts 16 as best shown in Fig. 2. Air is forced into the container 10 by reciprocating a plunger 18 in the pump barrel 13. The plunger is actuated by a piston 17 having a handle 21 on its upper end. A cap 19 on the upper end of the barrel 13 provides a guide for the piston 17. A base 20 on the lower end of the barrel 13 provides a longitudinally extending duct 22 having one end opening into the barrel 13 and the other end connected by a duct 23 with a vertically extending aperture 24.

Nipples 25 and 26 provide seats for the valves controlling the flow of air through the aperture 24 as the pump is actuated. The nipple 25 is mounted on the lower side of the base 20 and has an upwardly extending constricted portion threaded into the aperture 24. The nipple 26 is similarly mounted in the upper end of the aperture 24. A hollow plug 27 threaded into the lower end of the nipple 25 provides an air inlet duct 29 in longitudinal alignment with corresponding ducts 32 and 33 in the adjacent ends of the nipples 25 and 26, respectively. The upper end of the plug 27 converges to provide a seat for a ball 28 which normally closes the duct 29 in the plug. The nipple 25 provides a chamber 30 above the plug 27 in which the ball 28 is free to move when the pump plunger 18 is reciprocated. The nipple 26 provides a chamber 34 above the duct 33 in which another ball 28 is positioned. The chamber 34 converges downwardly and the ball 28 positioned therein acts as a valve controlling the duct 33. Upward movement of the plunger 18 unseats the lower ball 28 and permits air to flow from the outside into the barrel 13, a pin 30 preventing the ball from closing the duct 32. The lower ball 28 returns to its seat as soon as upward movement of the plunger 18 ceases. Downward movement of the plunger 18 unseats the upper ball 28 and permits air to flow from the barrel 13 into the chamber 24 and out through a conduit leading to the water container 10. Another pin 31 is positioned at the top of the chamber 34 to limit the upward movement of the ball 28 in the chamber and prevent the ball from closing the outlet from the chamber.

The described valve mechanism controls the pumping of air through a conduit terminating in a nipple 42 opening into the bottom of the container 10. The conduit comprises a nipple 35 providing an outlet from the chamber 34, a straight pipe section 36, a pipe nut 38, a curved pipe section 37, a pipe nut 39, a nipple 40 and a T 41 connected with the nipple 42. The nipple 42 and the T 41 in addition to providing an air inlet for the container 10 also provide an outlet for water flowing from the container through a pipe 43 and a pipe 48, to a steam generator forming a portion of the device. The flow of water through the pipe 43 is controlled by a valve 44 which is actuated by a stem 45 extending upwardly along the side of the container 10 and by means of which the valve is closed during the operation of pumping air into the container 10.

The steam generator portion of the device, generally designated by the numeral 51, is positioned along side the container 10. The generator 51 is contained in a cylindrical housing 52 which is fastened to and supported by the container 10 by means of clamps 54 as best shown in Fig. 2. A bolt 55 holds the free ends of the clamps 54 in operative engagement with studs 15 threaded into the wall of the container 10. The upper clamp 54 carries a projecting member 56 having a curved end providing a guide for the valve stem 45.

The upper end of the cylindrical housing 52 is provided with a removable cap 53 underneath which is positioned a head 57 of suitable insulating material. The lower end of the housing 52 is closed by a head comprising insulating members 58 and 59 fastened together by stud bolts 61 having spaced apart nuts so positioned as to clamp the members together.

The housing 52 contains a preheater into which water flows under pressure from the container 10 through the pipe 48 when the valve 44 is open. The preheater comprises an outer tube 63 and an inner tube 64, separated at their upper and lower ends, respectively, by spacers 65 and 66. The spacers 65 and 66 are preferably welded to provide a tight joint with the tubes 63 and 64. The water flowing from the pipe 48 into the annular space 105 between the tubes 63 and 64 is preheated and steam is generated therein at low temperature. The pipe 48 opens into the lower end of the annular space 105 and the water in rising circulates around such space and flows out at the top through a tube 68 as low temperature steam. The tube 68 extends downwardly and is connected with the lower end of a superheater positioned within the preheater and comprising an outer tube 69 and an inner tube 70. The tubes 69 and 70 are separated at their lower and upper ends by spacers 71 and 72, respectively, which are welded to enclose the ends of the annular space 106 between the tubes. The fluid in flowing from the preheater through the tube 68 ascends through the annular space 106 where the steam is superheated and then flows out at the top through a steam discharge pipe 74.

The discharge pipe 74 is connected by means of a pipe nut 75 with a pipe 76 projecting through the housing 52. An injector 77, mounted on the outer end of the pipe 76, is connected with a downwardly extending tube 78 terminating in a screen 79. The screen 79 is positioned in a vessel 80 shown in dotted lines as suspended from the injector 77 and which contains liquid to be vaporized in the manner hereinafter described.

Figure 6:
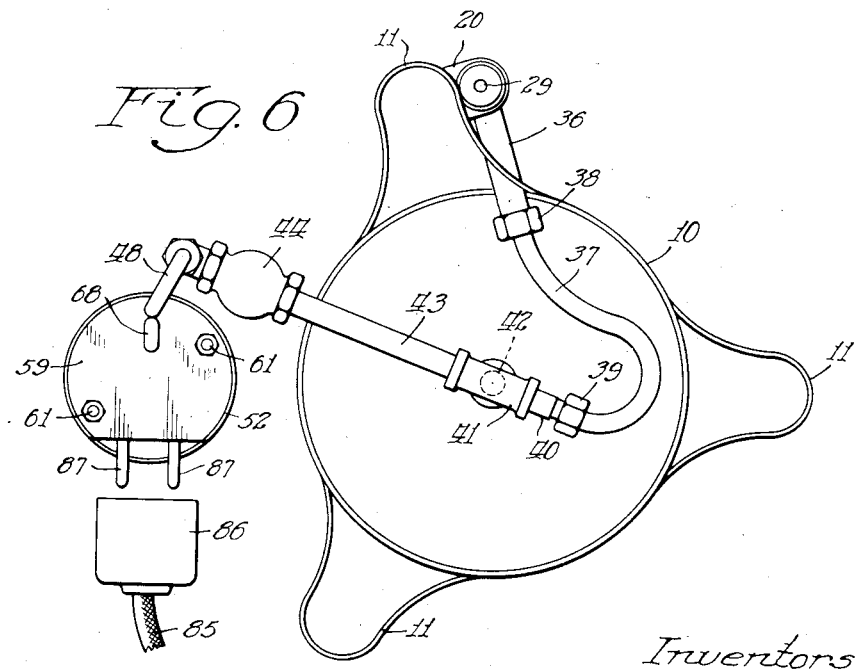
Fig. 6 is a bottom view of the device.

A resistance coil 92, positioned between the preheater and the superheater, provides the necessary heat energy both to preheat the water and to generate and superheat steam. Air is maintained in the water container at a pressure of approximately 65 to 75 pounds and the resistance coil 92 is so constructed that the superheated steam is maintained at a pressure of 60 pounds or above. The resistance coil 92 is wound closely about the superheater and is separated from the outer tube 69 by a sheet 91 of mica, or similar insulating material. A socket plug 86 shown in Fig. 6 is adapted to be connected by a cord 85 with a source of electrical energy (not shown). The device is operatively connected with the source of electrical energy by mounting the plug 86 on a pair of contact members 87 projecting from the lower end of the device. The contact members 87 are clamped between the heads 58 and 59 and are each operatively connected with one of a pair of binding posts 88. A conductor 90 connects one of the binding posts 88 with the lower end of the resistance coil 92. A conductor 89 connects the other binding post 88 with a binding post 93 mounted on the upper head 57. The upper end of the coil 92 is connected with a binding post 94 also mounted on the upper head 57.

The circuit through the resistance coil 92 is opened and closed by a switch operable to connect and disconnect the upper binding posts 93 and 94. The switch comprises a reciprocally movable block 96 of insulating material enclosed by a metal band 97. A resilient contact arm 104, connected with the post 93, presses against one side of the insulating block, and a contact member 95, operatively connected with the binding post 94, provides a guide for the other side of the block. The arm 104 is in contact with block 96 and the circuit is broken when the block is in the position shown in Fig. 7. The block 96 and the band 97 are reciprocally movable by a stem 98 which has one end connected with the block and is insulated from the band. The other end of the stem 98 projects through an opening 83 in the housing 51 and terminates in a knob 99. A compression spring 100 positioned between the knob 99 and the housing 51 holds the switch in broken circuit position as shown. The circuit is closed by pushing on the knob 99 to compress the spring 100 and move the switch inwardly to a point where the arm 104 contacts with the metal band 97, thereby completing the circuit between the upper binding posts 93 and 94. The switch is held in circuit closing position by moving the stem 98 to a point where the side wall of the housing 51, forming the lower boundary of the opening 83, engages a notch 101 in the lower side of the stem.

A thermostat, mounted in the housing 51, consists of a bar 102 of material having a high coefficient of expansion. One end of the bar 102 is attached to a base 103 and the other end terminates immediately underneath the stem 98. Upon the temperature reaching a predetermined maximum, the bar 102 expands sufficiently that its upper end contacts with and lifts the stem 108 upwardly, thereby disengaging the notched portion of the stem from holding engagement with the wall of the housing 51 and permitting the spring 100 to move the switch outwardly to the open circuit position shown in Fig. 8.

The injector on the outer end of the discharge pipe 76 may be of any suitable form to permit the mixture of superheated steam and liquid to escape as a fine spray of dry vapor. The injector 77 is so constructed that the escape of steam therethrough creates a vacuum which causes the liquid contents of the vessel 80 to flow up through the tube 78 and be entrained with the escaping steam. The injector 77 comprises a sleeve 107 threaded onto the end of the pipe 76, the outer end of the sleeve being closed and provided with an axial aperture 108. A nozzle 109, threaded in the pipe 76, provides a small longitudinal aperture 110 through which the steam flows from the pipe 76 into the sleeve 107 and is discharged through the aperture 108. The tube 78 is connected with the sleeve 107 adjacent the outer end of the nozzle 109. The steam in flowing from the sleeve 107 through the aperture 108 creates a vacuum tending to draw liquid through the tube 78 from the vessel 80. The superheated steam is maintained under pressure and at a temperature as described above that which is essential to its escape into the atmosphere as a dry vapor. The length and cross section of the tube 78 and the construction of the injector are such that the amount of liquid entrained with the steam is so limited that the temperature of the resulting mixture remains in excess of that essential to its discharge from the injector as a finely divided spray of dry vapor.

The vessel 80 provides a receptacle for a liquid solution of any insecticide, fumigant, vermin exterminator, deodorizing material or the like which it is desired to disseminate throughout a room and the crevices therein. The materials used for this purpose are usually in powder or granular form capable of dissolving in water or other suitable liquid solvent. The temperature of the superheated steam is sufficiently high that the mixture of steam and entrained liquid solution forms a dry vapor tending to disseminate itself throughout a room into which it is discharged. The temperature of the mixture is such that the material in solution retains its potency and when so disseminated the material retains unimpaired its original qualities as a vermin exterminator, fumigant or the like. By reason of its dry condition, there is no tendency of the vapor so disseminated to collect as a moisture on the furniture, walls or floor of the room or to leave a visible residue of the material thereon.

Thus, it will be seen that we have provided a novel device adapted to quickly generate and superheat steam and to mix the steam with a solution of the kind described to form a self-disseminating dry vapor.

Having thus described our invention, it is obvious that various immaterial modifications may be made in the same without departing from the spirit of our invention; hence we do not wish to be understood as limiting ourselves to the exact form, construction, arrangement and combination of parts herein shown and described, or uses mentioned.

What we claim as new and desire to secure by Letters Patent is:

1. In a device of the kind described, a steam generator comprising a pair of closely spaced telescoping tubes having their ends connected to provide a closed preheater chamber of relatively small lateral dimensions, a second pair of closely spaced telescoping tubes having their ends connected to provide a closed superheater chamber of relatively small lateral dimensions surrounded by and spaced apart from said preheater chamber, a resistance coil providing a heating unit surrounding said superheater chamber, a water inlet pipe opening into the lower end of the preheater chamber, a conduit connecting the upper end of the preheater chamber with the lower end of the superheater chamber, and a discharge pipe connected with the superheater chamber.

2. In a device of the kind described, a steam generator comprising a cylindrical housing, a pair of closely spaced concentric telescoping tubes positioned in said housing and having their ends connected to form a closed preheater chamber, a second pair of closely spaced concentric telescoping tubes having their ends connected to provide a closed superheater chamber surrounded by and concentric with said preheater chamber, a resistance coil providing a heating unit surrounding said superheater chamber, a water inlet pipe opening into the lower end of the preheater chamber, a conduit connecting the upper end of the preheater chamber with the lower end of the superheater chamber, means adapted to deliver water under pressure through said inlet pipe, and a pipe providing a discharge outlet for the superheater chamber.

3. In a device of the kind described, a steam generator comprising a housing, a pair of closely spaced telescoping tubular members positioned in the housing and having their ends connected to provide a closed preheater chamber, a second pair of closely spaced telescoping tubular members having their ends connected to provide a closed superheater chamber surrounded by said preheater chamber, a resistance coil providing a heating unit surrounding said superheater chamber, means for connecting said coil with a source of electrical energy, a water inlet pipe opening into the lower end of said preheater chamber, means adapted to deliver water under pressure through said inlet pipe, a conduit connecting the upper end of said preheater chamber with the lower end of said superheater chamber, a discharge pipe connected with the upper end of said superheater chamber.

4. In a device of the kind described, a steam generator comprising a cylindrical housing, a pair of closely spaced telescoping tubes positioned in the housing and having their ends connected to provide a closed annular preheater chamber, a second pair of closely spaced telescoping tubes having their ends connected to provide a closed annular superheater chamber surrounded by and concentric with said preheater chamber, a resistance coil providing a heating unit surrounding said superheater chamber, means for connecting said coil with a source of electrical energy, a water inlet pipe adapted to discharge water into the lower end of said preheater chamber, a conduit connecting the upper end of said preheater with the lower end of said superheater chamber, and a discharge pipe connected with the upper end of said superheater chamber.

5. In a device of the kind described, a steam generator comprising a pair of closely spaced telescoping tubular members having their ends connected to provide a closed pre-heater chamber and a second pair of telescoping tubular members having their ends connected to provide a closed super-heater chamber surrounded by said pre-heater chamber, a resistance coil providing a heating unit surrounding said heater chamber, a layer of electrical insulating material providing a spacer between said coil and super-heater chamber, a water inlet pipe opening into the lower end of the pre-heater chamber, a conduit connecting the upper end of the pre-heater chamber with the lower end of the super-heater chamber, and a pipe providing a discharge outlet for the super-heater chamber.

CLAYTON L. THORNE.
EDGAR L. TENNEY.